US012558655B2

(12) United States Patent
Gao et al.

(10) Patent No.: US 12,558,655 B2
(45) Date of Patent: Feb. 24, 2026

(54) TRANSPARENT REUSABLE ULTRAHIGH MOLECULAR WEIGHT POLYETHYLENE AIR FILTER

(71) Applicant: THE HONG KONG UNIVERSITY OF SCIENCE AND TECHNOLOGY, Hong Kong (CN)

(72) Inventors: Ping Gao, Hong Kong (CN); Qiao Gu, Hong Kong (CN); Shu Kwan Cheung, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 368 days.

(21) Appl. No.: 18/245,641

(22) PCT Filed: Sep. 16, 2021

(86) PCT No.: PCT/IB2021/000625
§ 371 (c)(1),
(2) Date: Mar. 16, 2023

(87) PCT Pub. No.: WO2022/058789
PCT Pub. Date: Mar. 24, 2022

(65) Prior Publication Data
US 2023/0356155 A1      Nov. 9, 2023

Related U.S. Application Data

(60) Provisional application No. 63/204,179, filed on Sep. 17, 2020.

(51) Int. Cl.
*B01D 53/02* (2006.01)
*B01D 46/00* (2022.01)
(Continued)

(52) U.S. Cl.
CPC ......... *B01D 69/02* (2013.01); *B01D 46/0001* (2013.01); *B01D 46/543* (2013.01);
(Continued)

(58) Field of Classification Search
CPC .... B32B 2038/0028; B32B 2038/0048; B32B 2250/02; B32B 2255/10; B32B 2260/02;
(Continued)

(56) References Cited

U.S. PATENT DOCUMENTS 5,310,414 A * 5/1994 Najjar .................. B01D 53/228
96/10
6,413,303 B2 7/2002 Gelderland et al.
(Continued)

FOREIGN PATENT DOCUMENTS

CA       2 969 700 C       3/2020
CN       1022890 C       12/1993
(Continued)

OTHER PUBLICATIONS

Translation of CN111491719 (Year: 2020).*
(Continued)

*Primary Examiner* — Christopher P Jones
(74) *Attorney, Agent, or Firm* — SALIWANCHIK, LLOYD & EISENSCHENK

(57) ABSTRACT

In particles removal with extremely high filtration efficiency and the ability to block submicron airborne particles by a sieving mechanism is provided. This novel nanoporous filter advantageously combines extremely high transmittance for visible light and ultraviolet light, reusability after cleaning or disinfection by ultraviolet irradiation or simple washing, a customizable sieving pore size ranging from a few nanometers to 500 nanometers, and the ability to carry bactericidal, virucidal or other reagents or particles on the nano or micro scale.

11 Claims, 5 Drawing Sheets

Sieve effect

(51) Int. Cl.

| | |
|---|---|
| *B01D 46/54* | (2006.01) |
| *B01D 67/00* | (2006.01) |
| *B01D 69/02* | (2006.01) |
| *B01D 69/12* | (2006.01) |
| *B01D 69/14* | (2006.01) |
| *B01D 71/26* | (2006.01) |
| *B32B 5/02* | (2006.01) |
| *B32B 27/08* | (2006.01) |
| *B32B 27/12* | (2006.01) |
| *B32B 27/32* | (2006.01) |
| *B32B 27/36* | (2006.01) |
| *B32B 37/18* | (2006.01) |
| *B32B 38/00* | (2006.01) |
| *C08J 5/18* | (2006.01) |
| *C08K 3/04* | (2006.01) |
| *C08K 3/08* | (2006.01) |
| *C08K 3/22* | (2006.01) |

(52) U.S. Cl.
CPC ... *B01D 67/0027* (2013.01); *B01D 67/00931* (2022.08); *B01D 69/1213* (2022.08); *B01D 69/148* (2013.01); *B01D 71/261* (2022.08); *B32B 5/022* (2013.01); *B32B 5/028* (2013.01); *B32B 27/08* (2013.01); *B32B 27/12* (2013.01); *B32B 27/32* (2013.01); *B32B 27/36* (2013.01); *B32B 37/182* (2013.01); *B32B 38/0012* (2013.01); *B32B 38/0036* (2013.01); *C08J 5/18* (2013.01); *C08K 3/042* (2017.05); *C08K 3/08* (2013.01); *C08K 3/22* (2013.01); *B01D 2275/10* (2013.01); *B01D 2279/40* (2013.01); *B01D 2325/02832* (2022.08); *B01D 2325/02833* (2022.08); *B01D 2325/02834* (2022.08); *B01D 2325/04* (2013.01); *B01D 2325/10* (2013.01); *B01D 2325/20* (2013.01); *B01D 2325/24* (2013.01); *B32B 2038/0028* (2013.01); *B32B 2038/0048* (2013.01); *B32B 2250/02* (2013.01); *B32B 2255/10* (2013.01); *B32B 2260/02* (2013.01); *B32B 2260/046* (2013.01); *B32B 2262/101* (2013.01); *B32B 2264/10* (2013.01); *B32B 2305/026* (2013.01); *B32B 2305/28* (2013.01); *B32B 2305/30* (2013.01); *B32B 2307/412* (2013.01); *B32B 2307/518* (2013.01); *B32B 2307/54* (2013.01); *B32B 2307/724* (2013.01); *B32B 2307/7376* (2023.05); *B32B 2309/105* (2013.01); *B32B 2315/085* (2013.01); *B32B 2323/04* (2013.01); *B32B 2367/00* (2013.01); *B32B 2571/00* (2013.01); *C08J 2323/06* (2013.01); *C08K 2003/0806* (2013.01); *C08K 2003/2265* (2013.01)

(58) Field of Classification Search
CPC ........ B32B 2260/046; B32B 2262/101; B32B 2264/10; B32B 2305/026; B32B 2305/28; B32B 2305/30; B32B 2307/412; B32B 2307/518; B32B 2307/54; B32B 2307/724; B32B 2307/7376; B32B 2309/105; B32B 2315/085; B32B 2323/04; B32B 2367/00; B32B 2571/00; B32B 27/08; B32B 27/12; B32B 27/32; B32B 27/36; B32B 37/182; B32B 38/0012; B32B 38/0036; B32B 5/022; B32B 5/028; C08J 2323/04; C08J 2323/06; C08J 5/18; C08K 2003/0806; C08K 2003/2265; C08K 3/042; C08K 3/08; C08K 3/22; B01D 2275/10; B01D 2279/40; B01D 2321/16; B01D 2321/343; B01D 2325/021; B01D 2325/02832; B01D 2325/02833; B01D 2325/02834; B01D 2325/04; B01D 2325/10; B01D 2325/20; B01D 2325/24; B01D 2325/44; B01D 46/0001; B01D 46/543; B01D 65/02; B01D 67/0027; B01D 67/0083; B01D 67/00931; B01D 69/02; B01D 69/1213; B01D 69/148; B01D 71/261; C08L 2207/068

See application file for complete search history.

(56) References Cited

U.S. PATENT DOCUMENTS

| | | | | |
|---|---|---|---|---|
| 6,780,217 | B1 | 8/2004 | Palmer | |
| 8,465,565 | B2 | 6/2013 | Calis et al. | |
| 8,795,601 | B2 | 8/2014 | Wiser et al. | |
| 2010/0239625 | A1 | 9/2010 | Puckett et al. | |
| 2010/0313753 | A1 | 12/2010 | Calis et al. | |
| 2012/0061314 | A1 | 3/2012 | Choi et al. | |
| 2014/0061114 | A1* | 3/2014 | Ramirez | B01D 71/261 |
| | | | | 210/489 |
| 2014/0091034 | A1 | 4/2014 | Ichinose et al. | |
| 2014/0217012 | A1* | 8/2014 | Wiesner | B01D 71/261 |
| | | | | 264/41 |
| 2017/0106334 | A1 | 4/2017 | Chu et al. | |
| 2017/0341035 | A1* | 11/2017 | Sato | B01D 71/26 |
| 2018/0043656 | A1* | 2/2018 | Song | H01M 50/491 |
| 2019/0185596 | A1* | 6/2019 | Li | D01D 5/06 |
| 2019/0198836 | A1* | 6/2019 | Ishihara | B01D 71/261 |
| 2019/0376918 | A1* | 12/2019 | Debie | B05D 7/22 |
| 2020/0020908 | A1* | 1/2020 | Nishimura | H01M 50/489 |
| 2020/0047473 | A1* | 2/2020 | Miura | B32B 27/302 |
| 2020/0067055 | A1* | 2/2020 | Murakami | C08J 9/0066 |
| 2020/0101427 | A1* | 4/2020 | Gao | A23L 2/085 |
| 2020/0277465 | A1* | 9/2020 | Kondo | H01M 50/403 |
| 2020/0360870 | A1 | 11/2020 | Gao et al. | |

FOREIGN PATENT DOCUMENTS

| | | | |
|---|---|---|---|
| CN | 203934693 | U | 11/2014 |
| CN | 105251268 | A | 1/2016 |
| CN | 205340344 | U | 6/2016 |
| CN | 208552902 | U | 3/2019 |
| CN | 109997247 | A | 7/2019 |
| CN | 110960995 | A | 4/2020 |
| CN | 111491719 | A | 8/2020 |
| EP | 0 785 732 | B1 | 4/2002 |
| EP | 2 268 386 | B1 | 7/2015 |
| JP | 5-202217 | A | 8/1993 |
| JP | 2011-31219 | A | 2/2011 |
| JP | 2012-523320 | A | 10/2012 |
| JP | 2013-532054 | A | 8/2013 |
| JP | 2014-94374 | A | 5/2014 |
| JP | 2018-131520 | A | 8/2018 |
| JP | 3227113 | U | 8/2020 |
| WO | 2011/146936 | A2 | 11/2011 |
| WO | 2012/173031 | A1 | 12/2012 |
| WO | 2017/059126 | A1 | 4/2017 |
| WO | 2019/123019 | A2 | 6/2019 |
| WO | 2020/018925 | A1 | 1/2020 |

OTHER PUBLICATIONS

Office Action dated Dec. 17, 2024 in Japanese Application No. 2023-517271.
International Search Report dated Jan. 28, 2022 in International Application No. PCT/IB2021/000625.
Li, P., et al., "Air Filtration in the Free Molecular Flow Regime: A Review of High-Efficiency Particulate Air Filters Based on Carbon Nanotubes," Small, 2014, 10(22):4543-4561.

(56)          References Cited

OTHER PUBLICATIONS

Choi, D.Y., et al., "Al-Coated Conductive Fibrous Filter with Low Pressure Drop for Efficient Electrostatic Capture of Ultrafine Particulate Pollutants," ACS Appl Mater. Interfaces, 2017, 9:16495-16504.

Rao, C., et al., "Capturing PM2.5 Emissions from 3D Printing via Nanofiber-based Air Filter," Scientific Reports, Sep. 4, 2017, 7(10366):1-10.

Viswanathan, G., et al., "High Efficiency Fine Particulate Filtration Using Carbon Nanotube Coatings**," Advanced Materials, Nov. 18, 2004, 16(22):2045-2049.

Avramescu, M., et al., "Filtration Performance of Permanently Hydrophilized Polyethylene Membranes," Lydall Performance Materials, 2014, pp. 1-7.

Wang, Z. et al., "Porous bead-on-string poly(lactic acid) fibrous membranes for air filtration," Journal of Colloid and Interface Science, 2015, 441:121-129.

Zhao, X., et al., "Porous cellulose nanofiber stringed HKUST-1 polyhedron membrane for air purification," Applied Materials Today, 2019, 14:96-101.

Zhao, X., et al., "Slip-Effect Functional Air Filter for Efficient Purification of PM2.5," Scientific Reports, Oct. 17, 2016, (35472):1-11.

Hua, T., et al., "Stable low resistance air filter under high humidity endowed by self-emission far-infrared for effective PM2.5 capture," Composites Communications, 2016, 6:29-33.

Zhang, S., et al., "Tailoring Mechanically Robust Poly(m-phenylene isophthalamide) Nanofiber/nets for Ultrathin High- Efficiency Air Filter," Scientific Reports, Jan. 11, 2017, 7(40550): 1-11.

* cited by examiner

Magnification of 20,000X

Magnification of 50,000X

Sieve effect

TRANSPARENT REUSABLE ULTRAHIGH MOLECULAR WEIGHT POLYETHYLENE AIR FILTER

CROSS-REFERENCE TO RELATED APPLICATIONS

This application is the U.S. national stage application of International Patent Application No. PCT/IB2021/000625, filed Sep. 16, 2021, which claims the benefit of U.S. Provisional Application Ser. No. 63/204,179, filed Sep. 17, 2020, which is hereby incorporated by reference in its entirety including any tables, figures, or drawings.

FIELD OF THE INVENTION

The present invention relates to the field of air purification filters. More particularly, the invention relates to an ultra-light nanoporous polymer air filter with high filtration efficiency, low pressure drop, and extremely high optical transmittance.

BACKGROUND OF THE INVENTION

An average person breathes more than 20 thousand times and exchanges ten thousand liters of air every day. Air is a fundamental necessity of life. However, air pollution together with airborne virus concerns have become a huge threat to humans. Purification of air, which most practically is realized by physical filtration or adsorption, can sufficiently help to counter the harmful effects caused by contaminated air. Many air filter products have desirable capability in terms of air purification, e.g., face masks and high efficiency particulate air (HEPA) filters. Nevertheless, none of the commercially available air filtration materials are optically transparent.

Puckett et al. US Patent App. No. 2010/0239625 discloses a panel formed from multilayer transparent films perforated with vent openings. Puckett lists "Suffocation" as the Wear/Feel Comment for a transparent face mask without vents, requires multiple layers with a gap between layers, and further notes the more layers used, the poorer the visibility through the mask.

Liu, C. et al. (Transparent air filter for high-efficiency PM2.5 capture. Nat. Commun. 6, 6205 (2015)) discloses transparent ultrathin filters of ~90% transparency with >95.00% removal of PM2.5 particles, ~60% transparency with >99.00% removal of PM2.5 particles, and ~30% transparency with >99.97% removal of PM2.5 particles. Liu states that on the basis of the particle size, PM is categorized by PM2.5 and PM10, which refer to particle sizes below 2.5 μm and 10 μm, respectively. PM2.5 pollution is particularly harmful since it can penetrate human bronchi and lungs owing to the small particle size. Hence, long-term exposure to PM2.5 increases morbidity and mortality.

Calis et al. U.S. Pat. No. 8,465,565 disclose a multilayered polyethylene membrane having a thickness of greater than 10 μm to less than 200 μm, and an average pore size of at least 0.5 μm.

BRIEF SUMMARY OF THE INVENTION

In one aspect the present invention may provide optically transparent air filters which represent a commercially and technologically disruptive advance. In another aspect the present invention may provide a transparent window screen which combines unimpaired vision, admission of natural light, and efficient filtration of incoming air (e.g., combining HEPA filtration and greater than 90% transmittance of visible light.) In another aspect, the present invention may provide a transparent face mask that can improve safety, comfort, and human interaction by safely filtering incoming and outgoing breath of the mask wearer, while allowing for improved visibility of the wearer's mouth, nose, or face. Improved visibility may further benefit individuals with hearing impairment by allowing improved perception of visual cues and facilitating lip reading.

In some embodiments the present invention may provide procedures to prepare an ultra-transparent nanoporous UHMWPE filter with high filtration efficiency (e.g., >99.995% for 0.1 micron particles) and low pressure drop (e.g., about 100 Pa at 5.3 cm/s flow velocity) for airborne particulate removal. Additionally, in certain embodiments the present invention provides a nanoporous UHMWPE filter which exhibits exceptional properties including extreme high light transmittance, mechanical strength, and robustness sufficient for reuse by washing and/or UV-disinfection. One embodiment of an UHMWPE filter in accordance with the present invention has been used to produce a product prototype for a transparent face mask which exhibits desirable performance characteristics for practical use.

Embodiments of the subject invention provide nanoporous nanofilms (e.g., UHMWPE films) having a nanofilm thickness of less than 1000 nanometers, alternatively less than 10000, 9000, 5000, 2000, 1100, 900, 800, 700, 600, 500, 400, 300, 200, 100, 90, 80, 70, 60, 50, 40, 30, or 20 nanometers, including increments, ranges, and combinations thereof. Film thickness (as well as the thickness of any filter, construct, laminate, or assembly in accordance with the subject invention) may be measured by techniques known in the art (e.g., single point or averaged-multi-point measurement(s) with physical contacting/probing such as by micrometer, scanning probe microscope, and the like; optical measurements such as optical transmittance/absorbance, interferometer, ellipsometry, cross-section scanning electron microscope, and the like; capacitance such as Hall effect, capacity meter, and the like; weighing methods such as microbalance, ultrabalance, and the like; spectrometry such as TOF-SIMS, dynamic XPS, XRF, and the like; or other instruments. National, regional, or international standards such as ASTM E252-06 could be used for measuring the thickness of embodiments according to the subject invention.)

Embodiments of the subject invention provide nanoporous nanofilms (e.g., UHMWPE films) comprising pores having an average pore size of less than 500 nanometers, alternatively less than 495, 490, 450, 400, 300, 200, 100, 80, 60, 40, 20, 10, 5, or 3 nanometers, including increments, ranges, and combinations thereof. The average pore size may alternatively be greater than 500 nanometers, alternatively greater than 400, 300, 200, 100, 80, 60, 40, 20, 10, 5, 3, or 1 nanometers, including increments, ranges, and combinations thereof. The average pore size may be about 106 nanometers, less than 106 nanometers, between 3 nanometers and 110 nanometers, between 20 nanometers and 40 nanometers, between 39 nanometers and 59.4 nanometers, or between 20 nanometers and 60 nanometers, including increments, ranges, and combinations thereof. Pore size may be measured by techniques known in the art (e.g., single point or averaged-multi-point measurement(s) with physical, optical, capacitance or other instruments including Brunauer-Emmett-Teller (BET) surface area analyzer, Mercury Porosimeter, Scanning electron microscope/transmission electron microscope (SEM/TEM) image analysis, and the like.)_Different filter materials in different application areas, technologies, or market segments (e.g., ceramic filters, fibrous filters, porous membranes, sponge-like absorbent media, and other embodiments or various applications of individual embodiments), may have different pore size characterization standards known in the art; each of which may be applied to quantify or identify thickness or other properties of embodiments of the subject invention.

Embodiments of the subject invention may provide nanoporous nanofilms (e.g., UHMWPE films) having a filtration efficiency of greater than 95%, alternatively greater than 50%, 60%, 70%, 80%, 90%, 96%, 97%, 98%, 99%, 99.5%, 99.9%, 99.95%, 99.99%, 99.995%, or 99.999% for 0.1 μm particles, including increments, ranges, and combinations thereof; alternatively greater than 50%, 60%, 70%, 80%, 90%, 96%, 97%, 98%, 99%, 99.5%, 99.9%, 99.95%, 99.99%, 99.995%, or 99.999% for 0.075 μm particles, including increments, ranges, and combinations thereof.

Embodiments of the subject invention provide nanoporous nanofilms (e.g., UHMWPE films) which exhibit a pressure drop of less than 1000 Pa, alternatively less than 900, 800, 700, 600, 500, 400, 300, 200, or 100 Pa, including increments, ranges, and combinations thereof, at a fluid velocity of 20 cm/s in air; alternatively in a specified gas composition (e.g., in the exhaust stream of an internal combustion engine); alternatively at or near atmospheric conditions (e.g., at 15° C., 1 atm pressure), alternatively about 200 Pa, alternatively less than 200, 190, 180, 170, 160, 150, 140, 130, 120, or 110 Pa at 5.3 cm/s flow velocity, including increments, ranges, and combinations thereof.

Embodiments of the subject invention provide nanoporous nanofilms (e.g., UHMWPE films) which exhibit a visible light transmittance of greater than 90%, alternatively greater than 50%, 60%, 70%, 80%, 95%, 96%, 97%, 98%, or 99%, including increments, ranges, and combinations thereof, e.g., as measured according to ASTM D1746 (Standard Test Method for Transparency of Plastic Sheeting), which is hereby incorporated herein in its entirety. While this ASTM standard requires to test in the light wavelength of (540 nm to 560 nm), it is further contemplated within the scope of the subject invention to test in the full UV-Vis spectrum (200 nm to 1100 nm) and report full spectrum visible results, accordingly.

Embodiments of the subject invention provide nanoporous nanofilms (e.g., UHMWPE films) which exhibit a Young's modulus of greater than 1.5 GPa and a tensile strength of greater than 800 MPa; alternatively a Young's modulus of between 1.5 GPa and 10 GPa and a tensile strength of between 800 MPa and 1300 MPa, including increments, ranges, and combinations thereof. Measurements of Young's modulus and tensile strength may be measured by methods commonly known in the art (e.g., following ASTM D882, Standard Test Method for Tensile Properties of Thin Plastic Sheeting; which is hereby incorporated by reference herein in its entirety.)

Certain embodiments may combine multiple advantageous characteristics. As a non-limiting example, such embodiments may include an air filter with any or all of the following characteristics: filtration efficiency higher than 95%, alternatively higher than 90%, 91%, 92%, 93%, 94%, 96%, 97%, 98%, 99%, 99.5%, 99.9%, 99.95%, 99.99%, or 99.995% for 0.1 micron particles, a pressure drop of about 200 Pa, alternatively less than 200, 190, 180, 170, 160, 150, 140, 130, 120, or 110 Pa at 5.3 cm/s flow velocity, a Young's modulus of greater than 1.5 GPa, a tensile strength of greater than 800 1MPa, and a visible light transmittance of greater than 90%. Alternatively, other combinations of individual filter characteristics disclosed herein may also be provided.

Embodiments of the subject invention provide methods of making a laminated nanofilm construct by providing a film comprising ultra-high molecular weight polyethylene (UHMWPE), the film having a thickness less than 1000 nanometers, alternatively less than 10000, 9000, 5000, 2000, 1100, 900, 800, 700, 600, 500, 400, 300, 200, 100, 90, 80, 70, 60, 50, 40, 30, or 20 nanometers, including increments, ranges, and combinations thereof; sequentially stretching the film in a first direction to form a preliminary pore structure in the film; afterwards stretching the film in a second direction, the second direction selected to manipulate the topology of the pores, or simultaneous biaxial stretching the film, both sequential and simultaneous biaxial stretching can form a triangular pore structure in the film, the triangular pore structure comprising triangular pores bound by nanofibers, the triangular pores having an average pore size of less than 100 nanometers; thermal annealing the nanofilm after stretching; grafting one or more nanoparticles into the nanofilm construct; and laminating the film onto a backing material to form the laminated nanofilm construct. One or more pores of the triangular pore structure may include a Delaunay feature which contributes to the structural integrity of the film. The step of grafting one or more nanoparticles into the nanofilm construct may include at least one of deposition, spin coating, dip coating, casting, spray coating, sputtering, or plasma etching. The one or more nanoparticles may be removable, partially removeable, or non-removable from the construct, and the one or more nanoparticles may include one or more of silver nanoparticles, platinum group metals, or perovskite. The one or more nanoparticles may also include particles with a size less than 100 nanometers. The step of grafting one or more nanoparticles into the nanofilm construct may also include a solution-based surface synthesis process including chemical reactions which occur at less than 120° C. The step of laminating the film onto a backing material is in some embodiments achieved by establishing Van der Waals force between the nanofilm and backing material. The method to establish Van der Waals force may include ultrasonic welding or sonic welding (e.g., sonic welding may include filling a gap between the film and the backing material with a solution where the solution could be one or more volatile or non-volatile solvents (e.g., ethanol, acetone, or other known solvents) and drying the solvent to provide an improved contact between the film and the backing material.)

Embodiments of the subject invention provide a film having a triangular pore structure in the film, the triangular pore structure comprising triangular pores bound by nanofibers, the triangular pores having an average pore size measurable by the diameter of an inscribed circle on a 2D representation of the triangular pore (e.g., an inscribed circle between three white fiber lines in either image of FIG. 1.) A triangular pore in accordance with an embodiment of the subject invention may be bounded by a geometric triangle, alternatively an approximation of a triangle where one or more sides (e.g., UHMWPE fibers) are not perfectly straight, but may exhibit a curved, curvilinear, irregular, or bent topology (e.g., as shown in FIG. 1.) Additionally, corners of individual triangles may exhibit varying levels of rounding, necking, or overlap between fibers. Triangles of differing sizes may overlap or engage with each other. Magnification may be selected to support measurement of a desired average pore size, or an individual pore size, a nominal pore size, or a distribution of pore sizes in an embodiment (e.g., including but not limited to the 20,000× and 50,000× magnification shown in FIG. 1.) Adjacent, connecting, overlapping, or proximate fibers around one or more pores may be of similar, the same, or different sizes (e.g., as visible in FIG. 1.)

In embodiments where the film is stretched in two directions (e.g., in a first direction and a second direction), these two directions may be perpendicular (e.g., at an angle of 90 degrees, alternatively, about perpendicular or about 90 degrees) to each other, or at an angle to the other direction. Suitable angles between the two directions include 175, 170, 160, 150, 140, 135, 130, 120, 110, 100, 95, 94, 93, 92, 91, 90, 89, 88, 87, 86, 85, 80, 70, 60, 50, 40, 45, 40, 30, 20, 10, and 5 degrees, including increments, ranges, and combinations thereof. A specific angle between the two directions may be advantageously selected to influence the topology of the entire pore structure or individual pores. Although two directions are exemplified herein, it is contemplated that additional pulling (e.g., simultaneous or sequential pulling) of the material in additional directions (e.g., the same or different directions from the first and second directions) may also be advantageously employed to influence the topology of the entire pore structure or individual pores.

Embodiments of the subject invention can be thermally annealed at certain temperature to help stabilize the nanofilm (e.g., to release and/or reduce internal strains or forces). Appropriate annealing temperatures may include 80° C., 90° C., 100° C., 110° C., 120° C., 130° C., 140° C., 150° C., and 160° C., including increments, ranges, and combinations thereof. Annealing may occur prior to, during, or after stretching. Annealing times and other process parameters include those known in the art, e.g., between about 30 seconds to about 30 minutes, e.g., less than 30 seconds, 30, 45, 60, 90 or 120 seconds, 1, 2, 3, 4, 5, 10, 15, 20, 25, or 30 minutes, or more than 30 minutes, including increments, ranges, and combinations thereof.

Embodiments of the subject invention provide an ultra-light nanoporous polymer air filter with high filtration efficiency, low pressure drop, and extremely high optical transmittance. The filter may include a laminated structure comprising an ultra-high molecular weight polyethylene (UHMWPE) nanofilm active layer having a thickness between 20 nanometers and 40 nanometers, a plurality of generally triangular pores comprising pore sizes between 3 nanometers and 300 nanometers, alternatively between 3 nanometers and 110 nanometers, alternatively between 3 nanometers and 200 nanometers, and a Young's modulus greater than 1.5 GPa. Certain embodiments may also include a backing material or a porous support layer. Further embodiments may also include at least one of an antibacterial additive, a reagent carrier for a reaction, or a catalyst for gas treatment.

Embodiments of the subject invention provide a transparent nanoporous UHMWPE filter for removal of contaminants from air to improve air quality, comprising a laminated structure comprising a UHMWPE nanofilm active layer and a backing material, one or more anti-bacterial additives, and a porous support layer. Further embodiments may also include one or more carriers for some reaction reagent, or a catalyst for gas treatment.

BRIEF DESCRIPTION OF THE DRAWINGS

Some embodiments of the present invention are illustrated as an example and are not limited by the figures of the accompanying drawings, in which like references may indicate similar elements and in which.

DETAILED DISCLOSURE OF THE INVENTION

One aspect of the present invention provides a highly transparent UHMWPE air filter with high filtration efficiency (>95% for 100 nm NaCl aerosol particles) as well as low pressure drop (~200 Pa at 5.3 cm/s) e.g., as measured according to one or more of (a) BS EN 149:2001+A1:2009 (Respiratory protective devices—Filtering half masks to protect against particles—Requirements, testing, marking); (b) China National Standard GB/T 6165-2008 (Test method of the performance of high efficiency particulate air filter—Efficiency and resistance); or (c) ASTM F1471 (Standard Test Method for Air Cleaning Performance of a High-Efficiency Particulate Air-Filter System); each of which is incorporated herein by reference in its respective entirety.

Figure 1:
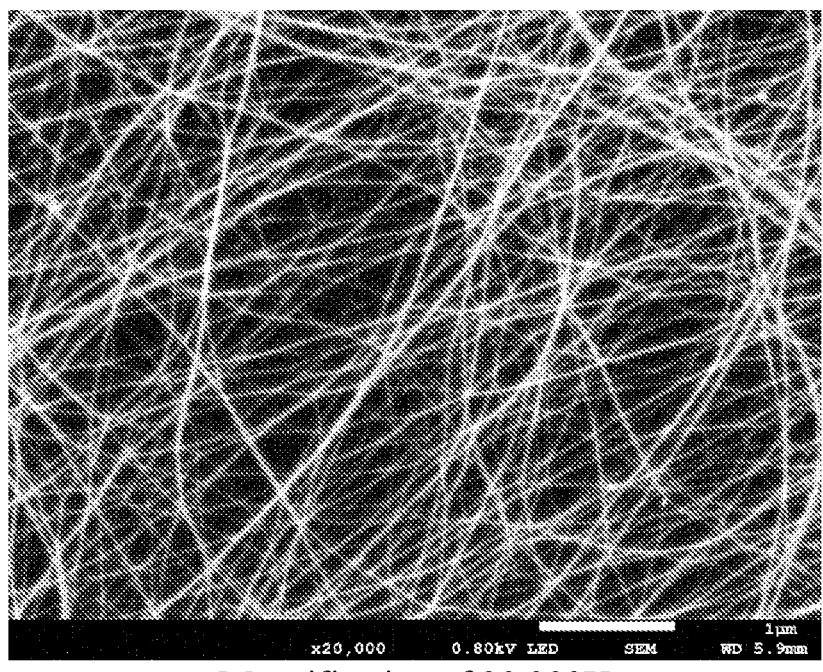
FIG. 1 depicts scanning electron microscopic (SEM) images of surface morphology of an UHMWPE biaxially oriented nanoporous membrane in accordance with certain embodiments of the present invention.
Figure 1:
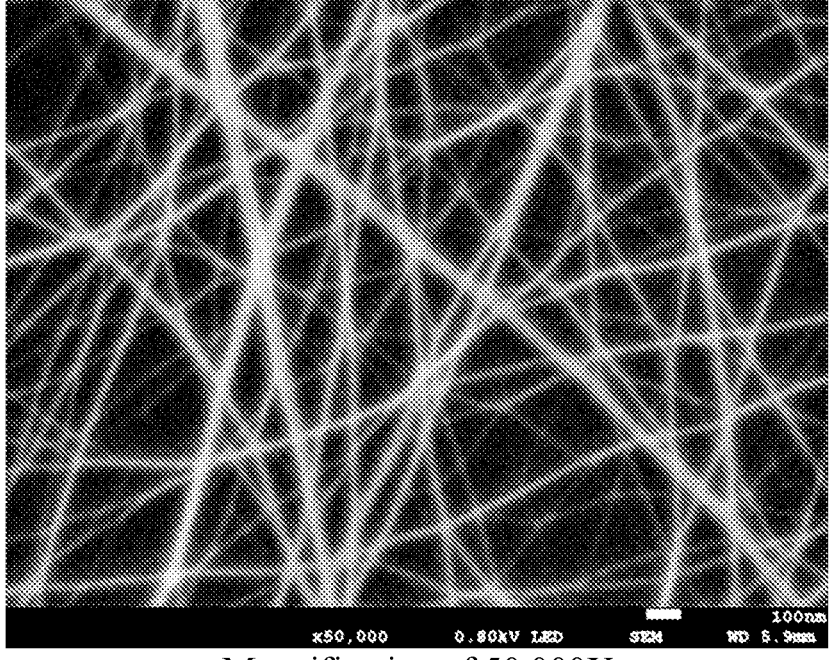
Figure 2:
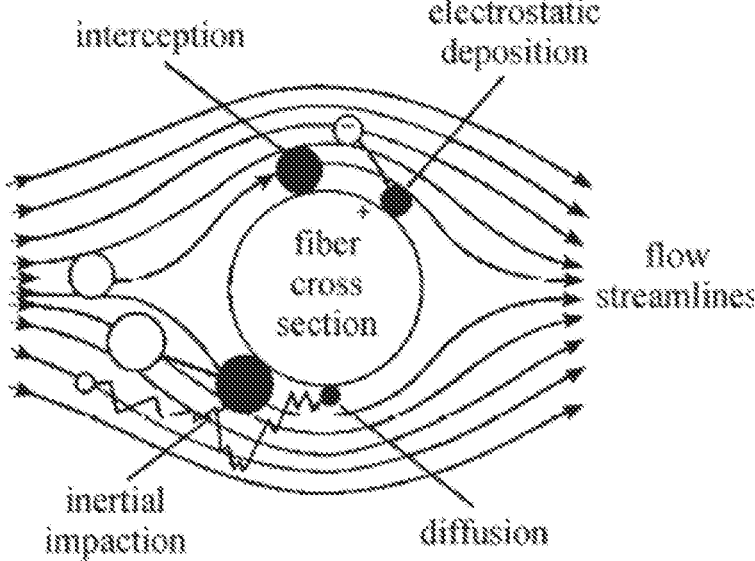
FIG. 2 illustrates certain particle deposition mechanisms observed in conventional HEPA filters and a type of sieve effect observed in accordance with certain embodiments of the present invention.
Figure 2:
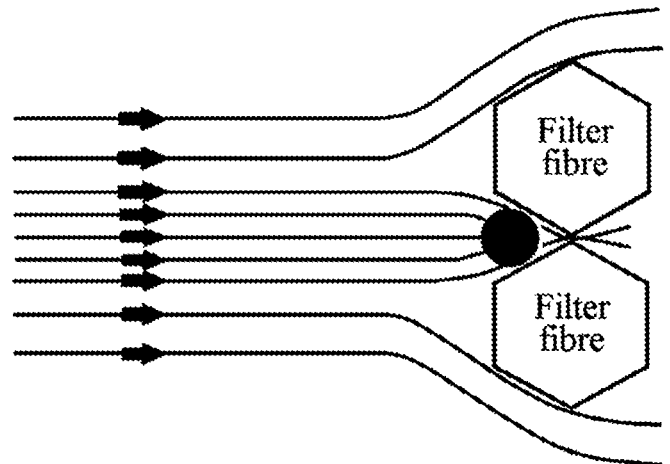

Another aspect of the present invention provides for fabrication of a UHMWPE membrane in the manner disclosed in US Patent Application Publication No. US 20200360870, which is incorporated herein by reference in its entirety, and where films of less than 0.1 µm in thickness are formed. In accordance with certain embodiments of the subject invention a filter may have an average pore size of about 100 nm as illustrated in FIG. 1. While not wishing to be bound by theory, the inventors hypothesize that in addition to known filtering mechanisms including Brownian diffusion, inertia impact, gravity settling, or electrostatic deposition as illustrated in FIG. 2, certain embodiments of the present invention may provide a UHMWPE air filter which captures particles via a sieving effect as described in Zhang, 2016, which is incorporated herein by reference in its entirety. Again without being bound by theory, it is believed that the particle capturing mechanism varies when particle size changes as (1) large particles (particle size>10 µm) may be primarily influenced by gravity settling and sieving effect; (2) medium particles (1 µm<particle size<10 µm) may be primarily influenced by inertia impaction and sieving effect; (3) small particles (0.3 µm<particle size<1µm) may be primarily influenced by interception and sieving effect; and ultrafine particles (0.05 µm<particles size<0.3 µm) may be primarily influenced by Brownian diffusion and sieving effect.

In a conventional fibrous filter, the pressure drop across the filter is caused by the combined effects of the resistance of each fiber to the flow of air past it. The pressure drop is due to the total drag force on all the fibers. As discussed in P. Li, et al. (Air filtration in the free molecular flow regime: A review of high-efficiency particulate air filters based on Carbon Nanotubes. Small. 10, 4553-4561 (2014).) which is incorporated herein by reference in its entirety, the pressure drop through the conventional air filter can be estimated using the equation:

$$\Delta P = \frac{\eta \delta v C_1}{d_f^2} \qquad \text{Equation (1)}$$

In contrast, for air filters that take advantage of a physical sieving mechanism, pressure drop across the filter can be predicted using the Knudsen diffusion equation as discussed in Chen, W. et al. (High-flux water desalination with interfacial salt sieving effect in nanoporous carbon composite membranes. Nat. Nanotechnol. 1-6 (2018). doi: 10.1038/s41565-018-0067-5); which is incorporated herein by reference in its entirety:

$$\Delta P = C_2 \frac{\delta v}{r} \qquad \text{Equation (2)}$$

where in equations (1) and (2), respectively: v is the air velocity, $\eta$ is the air viscosity, $\delta$ is the filter thickness, $C_1$, $C_2$ are constants which relate to the respective filter geometry, $d_f$ is the fiber diameter of a conventional filter and r is the pore radius of a nano-filter.

Comparing (1) to (2), C1 is a dimensionless constant, C2 may be represented with a unit of $kg/m^2 \cdot s$, $\eta$ and v are dependent on the fluid and flow condition and may be held constant across the two equations for a comparison. Typical values for $C_1$ may be between 0.03 to 30; while $C_2$ is typically on the order of 1000 $kg/m^2 \cdot s$ to 2000 $kg/m^2 \cdot s$ for air under ambient temperature. These values may differ due to the membrane structure. Typical values for $d_f$ may be 1 µm to 100 µm; and typical values for r may be 50 nm to 500 nm. Typical values for filter thickness, $\delta$, in a conventional filter are 5 µm to 100 µm. Typical values for filter thickness, $\delta$, in certain embodiments of the subject invention may be between 15 nm and 500 nm.

As a non-limiting example, certain prototype embodiments fabricated according to the subject invention were found to have a thickness of 20 nm to 50 nm and a pore size of 100 nm to 200 nm. According to Equation (2), assuming an inlet air flow rate is 0.05 m/s, the pressure is 40 Pa to 180 Pa. The actual pressure drops measured for corresponding embodiments of the subject invention were around 35 Pa for a 20 nm thick filter and 150 Pa for a 50 nm thick air filter.

For comparison, other UHMWPE materials (e.g., as described in Calis, et al., U.S. Pat. No. 8,465,565) typical filter thickness may be more than 20 µm which is 10,000 times thicker than certain embodiments of the subject invention, resulting in a correspondingly large increase in pressure drop from Equation (2).

Also for comparison, in a conventional air filter the filter thickness is around 0.15 mm, fiber diameter is around 20 µm. So according to Equation (1), the calculated pressure drop is within 0.056 Pa to 56.25 Pa. The actual measured pressure drop may typically be found in the range from 5 Pa to 25 Pa for commercially available conventional face masks (which may not filter or perform as well as embodiments of the subject invention.)

Apart from improved filtration efficiency and reduced pressure drop, increased light transmittance is another advantage of the subject invention. The light attenuation across an air filter can be simulated by the Lambert-Beer's law as discussed in Puckett, et al., Transparent Antimicrobial Face Mask. USPTO (2010). doi:10.1021/ed039p333; which is incorporated herein by reference in its entirety:

$$A = \varepsilon l c = \log_{10}\left(\frac{1}{T}\right) \qquad \text{Equation (3)}$$

where A is the absorbance of the material, $\varepsilon$ is called the absorptivity of the substance, l is the length of the light pathway, c is the molar concentration of polyethylene. The transmittance, T, is defined as the ratio of the transmitted intensity, I, over the incident intensity, $I_0$ and takes values between 0 and 1, or may also be expressed as a percentage transmittance. The absorbance has a logarithmic relationship to the transmittance; with an absorbance of 0 corresponding to a transmittance of 100% and an absorbance of 1 corresponding to 10% transmittance.

In certain embodiments of the subject invention, the light transmittance (T %) may be higher than 95% at the wavelength of 500 nm. The light path, l, refers to the film thickness of embodiments which may be within 100 nm. The c here refers to molar concentration of the material and it will keep constant for filters with the same composition (e.g., polyethylene.)

For comparison, the light transmittance (T %) of PET plastic sheet is around 85% at the wavelength of 500 nm. The l is the light path which refers to the film thickness and is typically within 0.05 mm.

The light absorptivity for polyethylene is around 103 $cm^{-1}$ in the visible light range (see for example, L. Z. Ismail, The Optical Absorption Coefficient of Amorphous Polyethylene in the Region 450-725 nm. Polym. Test. 7, 299-303 (1987), which is hereby incorporated by reference herein in its entirety. Specifically quoting the abstract: The optical absorption coefficient of amorphous polyethylene sheets was measured in the wavelength range 450-725 nm using a monomode ring dye laser. The incident laser power was 100 mW and the single sheet thickness used was 0.039 mm. The measured value of the absorption coefficient was 103.85 cm−1 and is substantially constant over the wavelength range used.)

The thinner the film, the higher the optical transmittance. There is a very good linearity when the disclosed filter's thickness is in the range of 10 nm to 200 nm. This equation is valid when the filter is extremely thin as internal scatterings in thicker filters will render non-linear effects, and only qualitative predictions can be inferred from this equation in thicker filters.

As seen in the above equations and discussion, a thinner filter may provide lower pressure drop and higher light transmittance. However, fragileness or poor mechanical properties of thin filters may be limiting factors for certain application of transparent ultrathin filters (e.g., air filters or ventilation masks.) Beneficial features of certain embodiments of the present invention may include mechanical robustness. The freestanding membrane may be robust enough to act as a standalone air filter even when its thickness is below 100 nm. Robustness for nanofiber filters may be defined as the ability to maintain filter integrity as discussed in Liu, C., et al. (Transparent air filter for high-efficiency PM2.5 capture. Nat Commun. 6, 6205 (2015).) which is incorporated herein by reference, in its entirety.

Turning now to the figures, FIG. 1 depicts two scanning electron microscopic (SEM) images of surface morphology of an UHMWPE biaxially oriented nanoporous membrane in accordance with certain embodiments of the present invention. The upper image is at a magnification of 20,000× and the lower image is at a magnification of 50,000×. From the image scale in the lower image, and average pore size of about 100 nm may be observed or measured in regions of this membrane.

FIG. 2 illustrates certain particle deposition mechanisms observed in conventional HEPA filters in an upper panel and the sieve effect observed in accordance with certain embodiments of the present invention in a lower panel. The sieving effect is based on a size exclusive mechanism. To filter out 0.1 μm ultrafine particles, the pore size of the filters should be smaller than the particle size (e.g., smaller than 0.1 μm.) Commercial air filter materials often possess pore size in the range of several microns, so it is not possible for commercial air filters to filter out smaller particles (e.g., sub-micron particles) by a sieving effect.

Figure 3:
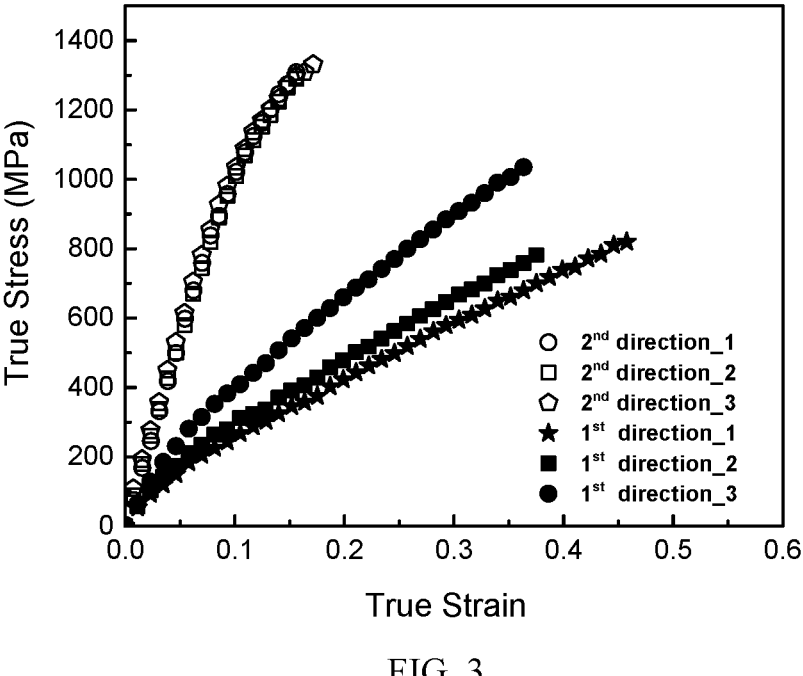
FIG. 3 shows tensile stress-strain curves of transparent UHMWPE air filters in accordance with certain embodiments of the present invention.

FIG. 3 shows certain tensile stress-strain curves of transparent UHMWPE air filters of a less than 100 nm thickness in accordance with an embodiment of the present invention. Film samples with solid film thicknesses and lateral dimensions of 5 mm×8 mm (59.4 nm thick) were used. All stress-strain tests were conducted at a constant Hencky strain rate of 0.001 s$^{-1}$ under ambient conditions. The difference between 1st direction stress-strain curves and 2nd direction stress-strain curves is attributed to the process wherein the film is sequentially biaxially stretched. In this chart 1st direction means the direction along first drawing of the material, the 2nd direction means the direction along the second drawing which was perpendicular to the 1st direction in this embodiment but could be taken at varying directions in other embodiments. The tensile test result shows the Young's modulus of the filter is over 10 GPa in the 2$^{nd}$ direction and averages above 2 GPa in the 1$^{st}$ direction; and its tensile strength values are above 1300 MPa (three times that of 304 stainless steel) in the 2$^{nd}$ direction and average above 800 MPa in the 1$^{st}$ direction, with sample 1$^{st}$ direction_3 reaching over 1000 MPa. The data represents three trials from samples with a thickness of 59 nm. The 1st and 2nd direction are from the same piece Filters in accordance with the subject invention may have a specific tensile strength that is several times (e.g., 3 times, alternatively greater than 3 times, alternatively greater than 5 times, alternatively greater than 10 times, alternatively greater than 20 times) higher than the specific tensile strength of stainless steel 304. This gives the film strong load-bearing capability of ultrathin films.

Figure 4A:
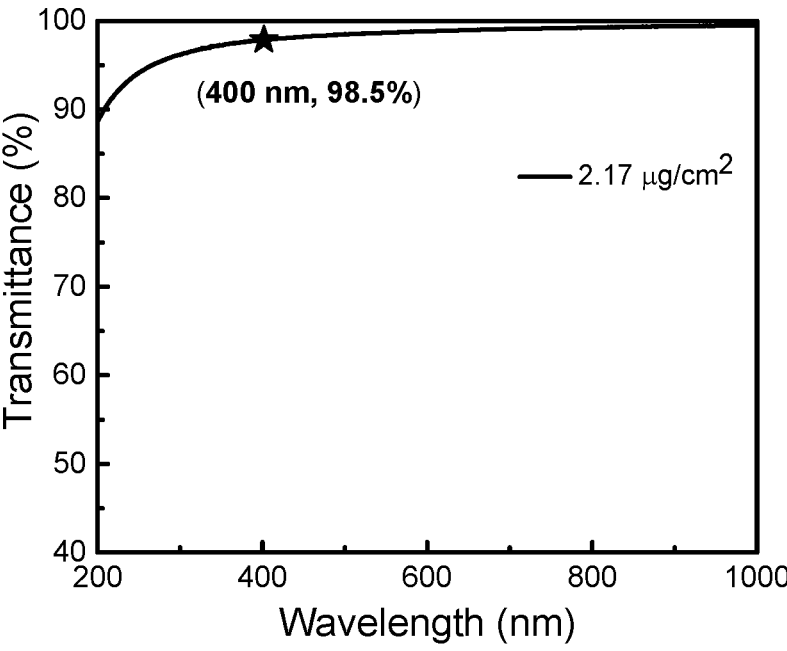
FIG. 4A shows the light transmittance spectra of a transparent UHMWPE air filter in accordance with certain embodiments of the present invention.

FIG. 4A shows the light transmittance spectra of a transparent UHMWPE air filter in accordance with an embodiment of the present invention. The UV-Vis light transmittance data was tested using the same materials and preparation method as tested for tensile stress-strain curves in FIG. 3. The UV-Vis transmittance results were averaged from 4 different locations of the same sample piece of transparent UHMWPE air filter material. The specimen size for FIGS. 4A and 4B measurement is 6 cm×6 cm×22 nm with a pore size around 100 nm, Young's Modulus 10 GPa, tensile strength of 1.2 GPa.

Figure 4B:
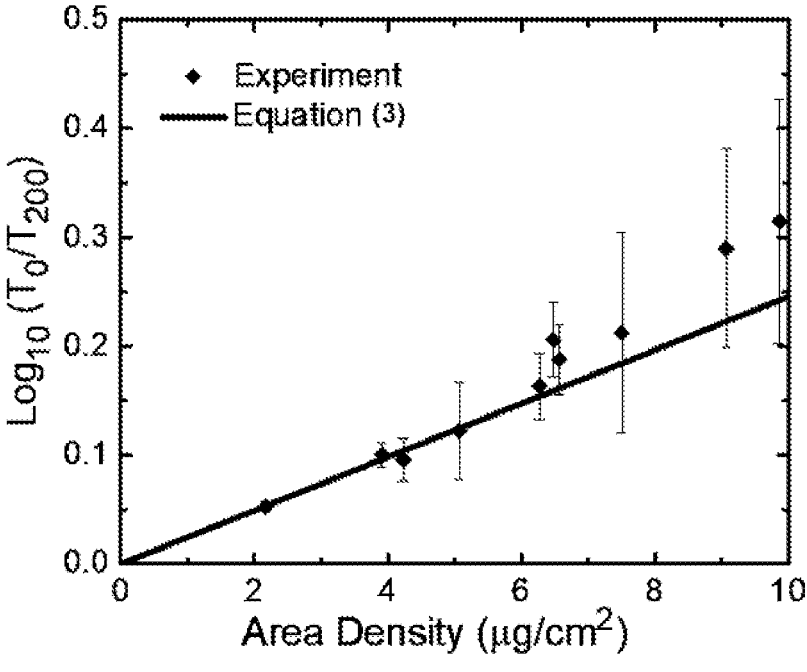
FIG. 4B shows the light transmittance measured data agreement with Equation (3) of a transparent UHMWPE air filter in accordance with certain embodiments of the present invention.

FIG. 4B shows the light transmittance measured data agreement with Equation (3) of a transparent UHMWPE air filter in accordance with certain embodiments of the present invention. Testing was performed on different unique samples, prepared by a process similar to the samples represented in FIG. 3. The air filter test specimen is cut into a square shape (6 cm×6 cm) and the 4 different test locations are chosen as vertical to the middle of each edge, the measured area is 5 mm×9 mm for each measurement. The transmittance measurement is tested by UV-Vis spectroscopy by standard transmission mode.

Figure 5:
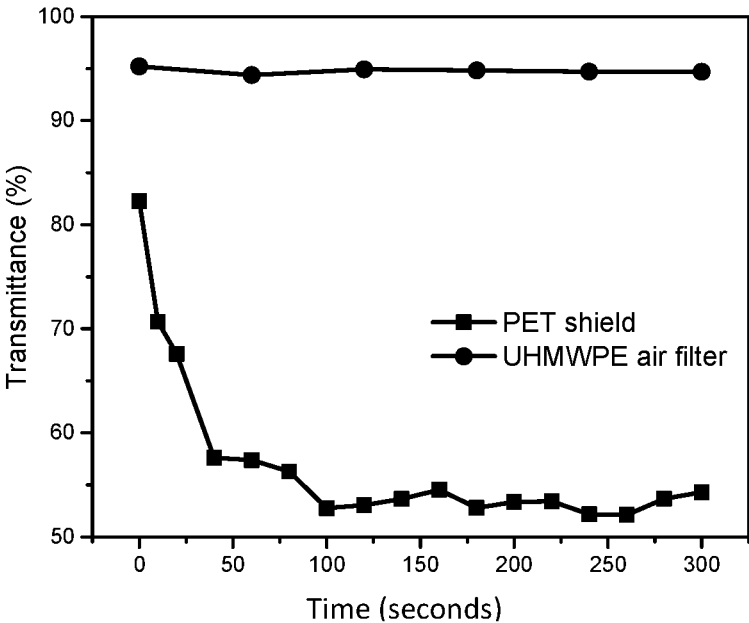
FIG. 5 shows the anti-fog property of a transparent UHMWPE air filter in accordance with certain embodiments of the present invention compared to a commercially available example of a transparent face shield made of polyethylene terephthalate (PET).

FIG. 5 shows the anti-fog property of a transparent UHMWPE air filter in accordance with certain embodiments of the present invention compared to a commercially available example of a transparent face mask made of Polyethylene terephthalate (PET), with testing protocol following the standard BS EN 168:2002 and ASTM F659-10 fog resistance test, which is incorporated herein by reference in its entirety. The specimen size for FIG. 5 measurement is 6 cm×6 cm×22 nm with a pore size around 100 nm, Young's Modulus 10 GPa, tensile strength of 1.2 GPa. Testing was performed on a different unique sample, prepared by a process similar to the samples represented FIG. 3, FIG. 4A, FIG. 4B, and FIG. 5. The commercially claimed "transparent face mask" uses transparent PET as a barrier which may block large droplets from passing but cannot filter or purify air. While not wishing to be bound by theory, the inventors hypothesize that the anti-fog property of a UHMWPE air filter in accordance with certain embodiments of the present invention may derive from the base material's intrinsic hydrophobicity and may be further amplified by its nanostructure. Owing to its strong hydrophobicity and advantageous nanostructure, moisture is less likely to condense on the surface of transparent filters or masks of the subject invention.

Figure 6:
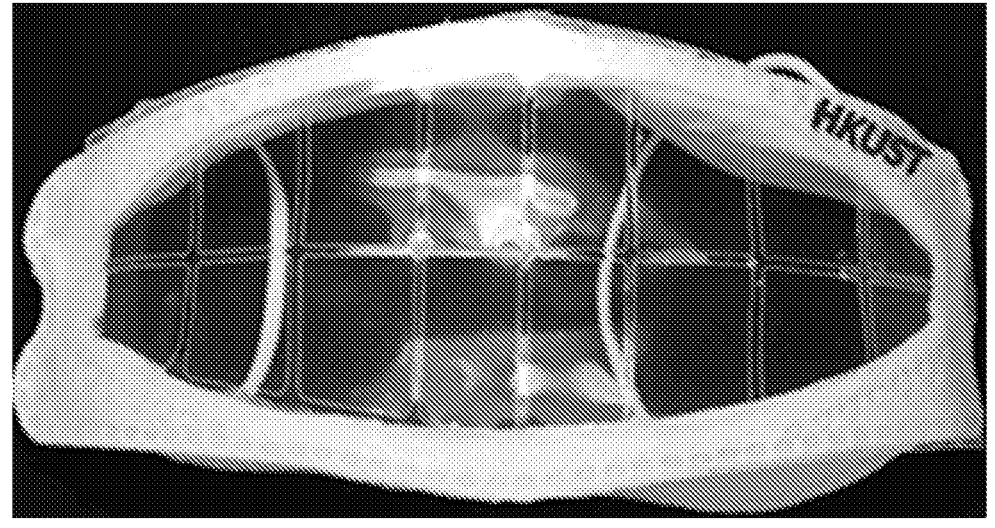
FIG. 6 shows a prototype for a face mask using a transparent UHMWPE air filter in accordance with an embodiment of the present invention.

FIG. 6 shows a prototype for a face mask using a transparent UHMWPE air filter in accordance with certain embodiments of the present invention. This prototype was tested according to the test protocol for NOISH NaCl particle test standard and GB 2626-2020 respirator testing standard, which is incorporated herein by reference in its entirety. For 0.075 μm aerosol particles, the filtration efficiency was greater than 95%. At a flow rate of 85 L/min, the pressure drop was below 350 Pa. The specimen size for FIG. 6 measurement is 6 cm×6 cm×22 nm with a pore size around 100 nm, Young's Modulus 10 GPa, tensile strength of 1.2 GPa. The testing area is around 20 cm$^2$ due to the testing instrument's limitation. Testing was performed on a different unique sample, prepared by a process similar to the samples represented in FIG. 3, FIG. 4A, FIG. 4B, and FIG. 5.

A blood penetration test (Fluid resistance test) was tested for an embodiment according to the YY0469-2011 Surgical Mask standard, which is incorporated herein by reference in its entirety, and found to have a blood penetration value of 120 mm Hg.

In order that the present disclosure may be more readily understood, certain terms are defined below, and throughout the detailed description, to provide guidance as to their meaning as used herein.

As used herein, the terms "a," "an," "the" and similar terms used in the context of the present invention are to be construed to cover both the singular and plural unless otherwise indicated herein or clearly contradicted by the context. Thus, for example, reference to "an arm" or "a hole" should be construed to cover or encompass both a singular arm or a singular hole and a plurality of arms and a plurality of holes, unless indicated otherwise or clearly contradicted by the context.

As used herein, the terms "about" and "approximately" shall generally mean an acceptable degree of error for the quantity measured given the nature or precision of the measurements. Exemplary degrees of error are within 20 percent (%), typically, within 10%, and more typically, within 5% of a given value or range of values.

As used herein, the term "and/or" should be understood to mean "either or both" of the features so conjoined, i.e., elements that are conjunctively present in some cases and disjunctively present in other cases.

As used herein, the terms "comprising", "consisting of" and "consisting essentially of" are defined according to their standard meaning. The terms may be substituted for one another herein in order to attach the specific meaning associated with each term.

As used herein, the term "or" should be understood to have the same meaning as "and/or" as defined above. For example, when separating a listing of items, "and/or" or "or" shall be interpreted as being inclusive, i.e., the inclusion of at least one, but also including more than one, of a number of items, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of"

As used herein, the acronym "PET" should be understood to mean polyethylene terephthalate.

As used herein, the acronym "UHMWPE" should be understood to mean ultra-high molecular weight polyethylene.

MATERIALS AND METHODS

All patents, patent applications, provisional applications, and publications referred to or cited herein are incorporated by reference in their entirety, including all figures and tables, to the extent they are not inconsistent with the explicit teachings of this specification.

The present disclosure is to be considered as an exemplification of the invention and is not intended to limit the invention to the specific embodiments illustrated by the figures or description below.

Example 1: One method to fabricate a transparent face make is to overlay the UHMWPE air filter of the subject invention onto a hollow scaffold (e.g., a hollow PET sheet) and then integrate the scaffold with a frame and/or cushion material to create a functional face mask. Polyethylene terephthalate (PET) film (Lumirror™ High Transparency grade) was purchased from Toray (Tokyo, Japan). This PET film has a thickness of 100 μm, density of 1.3-1.4g/cm³. A laser cutter was used to cut the PET film into a hollow scaffold. Various cushion materials were tested, including but not limited to Polydimethylsiloxane, rubber, and optical glue. Other soft, compliant, and or supportive cushion materials are contemplated within the subject invention, and cushion materials may be coated or painted on the hollow scaffold to protect the filter material from breaking by the rigid scaffold material.

Example 2: A prototype was constructed to show that a transparent nanoporous UHMWPE air filter can also be conformed onto various porous backing materials (e.g., nonwoven fabrics or glass fiber meshes) and the laminated structure can be mounted onto a HEPA/ULPA module as a window screen or other structured filter. The porous backing materials could include melt blown polypropylene fabrics, Nylon fabrics, Polyester fabrics, other polymer, fiber, expanded metal, mesh, or glass fiber fabrics. Suitable glass fiber fabric can be purchased from ADFORDS (Saint-Gobain ADFORS, Paris, France) e.g., with a mesh number higher than 100. The HEPA/ULPA modules could be in a cylinder shape or flat plate shape, and folded, corrugated, or flat topology, depending on the specific application scenarios. Known adhesives, glues, or sealants could be used for fabricating the HEPA/ULPA modules. The disclosed UHMWPE air filter and porous backing materials may form the active filtering component. Via lamination methods including hot press, ultrasonic wielding, solvent welding, chemical crosslinking, adhesive gluing, and the like. The number of layers and assembly method could be further adjusted according to the application requirement.

Example 3: Prototype sample materials have been constructed to test the ability of embodiments in loading catalysts (e.g., silver nanowire, silver nanoparticles, graphene, and iron oxide) A transparent nanoporous UHMWPE air filter can be further loaded with one or more catalyst reagents such as silver nanowires or silver nanoparticles, graphene, iron oxide, or other reagents; the loaded filter could be mounted inside the gas exhaust as a tail gas treatment unit (e.g., for an internal combustion engine.) The catalysts may include substances that can promote the chemical reaction/process to convert the inlet component into other components. Usually for this application, the catalyst reagents convert harmful/useless exhaust components into nontoxic and/or useful components.

Examples of silver nanowires and nanoparticles tested with the subject invention include those purchased from Sigma-Aldrich (St. Louis, MO, USA.) The rod diameter or particle size of these silver nanomaterials may in some cases be less than 50 nm to ensure high light transmittance. Other reagents include some platinum group metals (e.g., platinum, palladium and rhodium) for industrial waste gases treatment. Other reagents can also include titanium dioxide for household volatile organic compound (e.g., formaldehyde, and the like) treatment.

Example 4: Embodiments shown in FIG. 1 comprise a precursor gel film material composed of ultrahigh molecular weight polyethylene following the procedure from US Patent Application Publication No. US 20200360870. The method included biaxial stretching the precursor gel film with a drawing ratio of higher than 20×20 under a hot convection chamber (100° C. to 150° C.), followed by thermal annealing (100° C. to 150° C.). This produced a film with Thickness: 20 to 50 nm; Pore size: around 100 nm; Strength: 900-1200 MPa ultimate tensile strength; Light transmittance: >98% at wavelength of 500 nm; Pull direction: Biaxial stretching in which the two directions are perpendicular to each other. This sample is made by the same manufacturing parameters and precursor films with other figures.

Example 5: Embodiments tested to produce stress and strain data in FIG. 3 were produced by the same method and exhibited the same measured range of properties as those noted in Example 4 (FIG. 1, in the preceding paragraph).

Example 6: Embodiments tested to produce Transmittance data in FIG. 4A and FIG. 4B were produced by the same method and exhibited the same measured range of properties as those noted in Example 4 (FIG. 1, above).

More than 100 sample pieces were tested in terms of their light transmittance. The results are highly reproducible. The data to support the light transmittance vs thickness is shown in FIG. 4B. Numerous measurements were conducted to find the correlation with Equation (3).

Example 7: Embodiments tested to produce Transmittance data over time with fogging in FIG. 5 and the prototype in FIG. 6 were produced by the same method and exhibited the same measured range of properties as those noted in Example 4 (FIG. 1, above).

EXEMPLIFIED EMBODIMENTS

The invention may be better understood by reference to certain illustrative examples, including but not limited to the following:

Embodiment 1. A nanoporous nanofilm comprising:

a nanofilm thickness of less than 1000 nanometers, and pores having an average pore size of less than 500 nanometers.

Embodiment 2. The nanofilm of Embodiment 1, wherein the average pore size is equal to or less than about 106 nanometers.

Embodiment 3. The nanofilm of Embodiment 1, wherein the average pore size is less than 100 nanometers.

Embodiment 4. The nanofilm of Embodiment 1, wherein the average pore size is between 3 nanometers and 110 nanometers.

Embodiment 5. The nanofilm of Embodiment 1, wherein the average pore size is between 110 nanometers and 500 nanometers.

Embodiment 6. The nanofilm of Embodiment 5, wherein the thickness is between 20 nanometers and 60 nanometers.

Embodiment 7. The nanofilm of Embodiment 6, further comprising UHMWPE.

Embodiment 8. The nanofilm of Embodiment 7, wherein the nanofilm has a filtration efficiency of greater than 95% for 0.1 μm particles.

Embodiment 9. The nanofilm of Embodiment 8, wherein the nanofilm exhibits a pressure drop of less than 1000 Pa at a fluid velocity of 20 cm/s.

Embodiment 10. The nanofilm of Embodiment 9, wherein the nanofilm exhibits a visible light transmittance of greater than 90%.

Embodiment 11. The nanofilm of Embodiment 10, wherein the nanofilm exhibits a

Young's modulus of greater than 1.5 GPa and a tensile strength of greater than 800 MPa.

Embodiment 12. The nanofilm of Embodiment 11, wherein the nanofilm exhibits a Young's modulus of between 1.5 GPa and 10 GPa and a tensile strength of between 800 MPa and 1300 MPa.

Embodiment 13. A method of making a laminated nanofilm construct, the method comprising:

providing a film comprising ultra-high molecular weight polyethylene (UHMWPE), the film having a thickness less than 1000 nanometers, biaxial stretching and thermal annealing the film to form a triangular pore structure in the film, wherein the biaxial stretching and thermal annealing comprises:

(a) simultaneous biaxial stretching the film in at least a first direction and a second direction selected to manipulate the topology of the pores followed by thermal annealing to form a triangular pore structure in the film, or (b) sequential biaxial stretching the film followed by thermal annealing to form a triangular pore structure in the film, wherein the sequential biaxial stretching comprises:

(i) stretching the film in a first direction to form a preliminary pore structure in the film, (ii) stretching the film in a second direction, the second direction selected to manipulate the topology of the pores to form a triangular pore structure in the film, the triangular pore structure comprising triangular pores bound by nanofibers, the triangular pores having an average pore size of less than 100 nanometers, grafting one or more nanoparticles into the nanofilm construct, and laminating the film onto a backing material to form the laminated nanofilm construct.

Embodiment 14. The method of Embodiment 13, wherein one or more pores of the triangular pore structure comprise a Delaunay feature that contributes to the structural integrity of the film.

Embodiment 15. The method of Embodiment 13, wherein the step of grafting one or more nanoparticles into the nanofilm construct comprises at least one of deposition, spin coating, dip coating, casting, spray coating, sputtering, and plasma etching.

Embodiment 16. The method of Embodiment 13, wherein the one or more nanoparticles are removable, partially removeable, or non-removable from the construct, and the one or more nanoparticles comprise one or more of silver nanoparticles, platinum group metals, and perovskite.

Embodiment 17. The method of Embodiment 13, wherein the one or more nanoparticles comprise particles with a size less than 100 nanometers.

Embodiment 18. The method of Embodiment 13, wherein the step of grafting one or more nanoparticles into the nanofilm construct comprises a solution-based surface synthesis process comprising chemical reactions which occur at less than 120° C.

Embodiment 19. The method of Embodiment 13, wherein the step of laminating the film onto a backing material comprises ultrasonic wielding, or solvent welding; wherein the solvent welding comprises filling a gap between the film and the backing material with a volatile solvent and drying the solvent to provide an improved contact between the film and the backing material.

Embodiment 20. An ultra-light nanoporous polymer air filter with high filtration efficiency, low pressure drop, and extremely high optical transmittance, comprising:

a laminated structure comprising an ultra-high molecular weight polyethylene (UHMWPE) nanofilm active layer having a thickness between 20 nanometers and 40 nanometers, a plurality of generally triangular pores comprising pore sizes between 3 nanometers and 110 nanometers, and a Young's modulus greater than 1.5 GPa.

Embodiment 21. The ultra-light nanoporous polymer air filter of Embodiment 20, further comprising:

a backing material; and a porous support layer.

Embodiment 22. The ultra-light nanoporous polymer air filter of Embodiment 21, further comprising at least one of an antibacterial additive, a reagent carrier for a reaction, or a catalyst for gas treatment.

Embodiment 23. A transparent nanoporous UHMWPE filter for removal of contaminants from air to improve air quality, comprising:

a laminated structure comprising a UHMWPE nanofilm active layer and a backing material, one or more antimicrobial additives containing a registered antimicrobial agent and comprising at least one agent selected from the group consisting of silver nanoparticles, platinum group metals, or perovskite nanoparticles with particle size less than or equal to 100 nm, and a porous support layer that provides strength against external force to maintain a shape of the filter, the porous support layer comprising at least one material selected from the group consisting of nonwoven fabrics, polyester fabrics, hollow plastic sheet, and cotton fabrics.

Embodiment 23. A transparent nanoporous UHMWPE filter for removal of contaminants from air to improve air quality, comprising:

a UHMWPE nanofilm active layer, a support material, and a catalyst for gas treatment.

Embodiment 24. The transparent nanoporous UHMWPE filter of embodiment 23, wherein the catalyst comprises a platinum group metal and the gas treatment comprises industrial waste gas treatment.

Embodiment 25. The transparent nanoporous UHMWPE filter of embodiment 24, wherein the platinum group metal comprises platinum, palladium, or rhodium.

Embodiment 26. The transparent nanoporous UHMWPE filter of embodiment 23, wherein the catalyst comprises titanium dioxide and the gas treatment comprises household volatile organic compound treatment.

Embodiment 27. The transparent nanoporous UHMWPE filter of embodiment 26, wherein the household volatile organic compound treatment comprises formaldehyde treatment.

Embodiment 28. The transparent nanoporous UHMWPE filter of embodiment 23, wherein the gas treatment comprises exhaust treatment, industrial waste gas treatment, or indoor air purification.

Although the present invention has been illustrated and described herein with reference to preferred embodiments and specific examples thereof, it will be readily apparent to those of ordinary skill in the art that other embodiments and examples may perform similar functions and/or achieve like results.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

We claim:

1. A nanoporous nanofilm comprising:

a nanofilm thickness of less than 1000 nanometers, and pores having an average pore size of less than 500 nanometers, wherein the nanofilm has a filtration efficiency of greater than 95% for 0.1 μm particles, and wherein the nanofilm exhibits a visible light transmittance of greater than 90%.

2. The nanofilm of claim 1, wherein the average pore size is equal to or less than about 106 nanometers.

3. The nanofilm of claim 1, wherein the average pore size is less than 100 nanometers.

4. The nanofilm of claim 1, wherein the average pore size is between 3 nanometers and 110 nanometers.

5. The nanofilm of claim 1, wherein the average pore size is between 110 nanometers and 500 nanometers.

6. The nanofilm of claim 3, wherein the thickness is between 20 nanometers and 60 nanometers.

7. The nanofilm of claim 6, further comprising ultra-high molecular weight polyethylene (UHMWPE).

8. The nanofilm of claim 7, wherein the nanofilm exhibits a pressure drop of less than 1000 Pa at a fluid velocity of 20 cm/s.

9. The nanofilm of claim 8, wherein the nanofilm exhibits a Young's modulus of greater than 1.5 GPa and a tensile strength of greater than 800 MPa.

10. The nanofilm of claim 9, wherein the nanofilm exhibits a Young's modulus of between 1.5 GPa and 10 GPa and a tensile strength of between 800 MPa and 1300 MPa.

11. An ultra-light nanoporous polymer nanofilm with high filtration efficiency, low pressure drop, and extremely high optical transmittance comprising:

a catalyst made of a silver nanowire, silver nanoparticles, graphene, or iron oxide; and a porous UHMWPE nanofilm exhibiting:

a thickness of less than 1000 nanometers, an average pore size of less than 500 nanometers a filtration efficiency of greater than 95% for 0.1 μm particles, a pressure drop of less than 1000 Pa at a fluid velocity of 20 cm/s, a visible light transmittance of greater than 90%, a Young's modulus of greater than 1.5 GPa, and a tensile strength of greater than 800 MPa.

\*    \*    \*    \*    \*